United States Patent [19]

Okada

[11] 4,399,162
[45] Aug. 16, 1983

[54] DIPEPTIDE SWEETENING COMPOSITION

[75] Inventor: Yuzo Okada, Kamakura, Japan

[73] Assignee: Ajinomoto Company, Inc., Tokyo, Japan

[21] Appl. No.: 245,434

[22] Filed: Mar. 19, 1981

[30] Foreign Application Priority Data

Mar. 19, 1980 [JP] Japan ................................ 55-35046
Apr. 18, 1980 [JP] Japan ................................ 55-51383

[51] Int. Cl.$^3$ ............................................. A23L 1/236
[52] U.S. Cl. .................................................... 426/548
[58] Field of Search ........................................ 426/548

[56] References Cited

U.S. PATENT DOCUMENTS

| | | | |
|---|---|---|---|
| 3,295,993 | 1/1967 | Yoshida et al. | 426/548 |
| 3,642,491 | 2/1972 | Schlatter | 426/548 |
| 3,647,482 | 3/1972 | Yueh | 426/548 X |
| 3,801,563 | 4/1974 | Nakajima et al. | 426/548 X |
| 3,851,073 | 11/1974 | Cook | 426/548 X |
| 3,934,047 | 1/1976 | Schade | 426/548 |
| 4,254,155 | 3/1981 | Dwivedi | 426/548 |

FOREIGN PATENT DOCUMENTS

| | | | |
|---|---|---|---|
| 1963736 | 6/1971 | Fed. Rep. of Germany | 426/548 |
| 2851055 | 5/1979 | Fed. Rep. of Germany | 426/548 |
| 52-71499 | 6/1977 | Japan | 426/548 |
| 55-46699 | 11/1980 | Japan | 426/548 |
| 1274288 | 5/1972 | United Kingdom | 426/548 |
| 1274383 | 5/1972 | United Kingdom | 426/548 |

*Primary Examiner*—Joseph M. Golian
*Attorney, Agent, or Firm*—Oblon, Fisher, Spivak, McClelland & Maier

[57] ABSTRACT

A dipeptide sweetening composition, comprising a unit weight of a dipeptide sweetener and at least one flavoring agent in an amount sufficient to impart the tasting strength equal to that of 10 to 200% by weight of monosodium L-glutamate based upon the weight of the dipeptide sweetener, the flavoring agent being selected from the group consisting of sodium glutamate, sodium inosine-5'-phosphate, sodium guanosine-5'-phosphate and sodium aspartate.

4 Claims, No Drawings

DIPEPTIDE SWEETENING COMPOSITION

BACKGROUND OF THE INVENTION

1. Field of the Invention

The present invention relates to a dipeptide sweetening composition. More particularly, the present invention is concerned with a dipeptide sweetening composition having a thickness and a roundness like sucrose in its taste, the sweetness of which is improved over that of dipeptide sweeteners alone.

2. Description of the Prior Art

Dipeptide sweeteners such as α-L-aspartyl-L-phenylalanine-methylester are generally known as sweetening agents which have the quality of possessing a clear initial sweet taste without leaving an unpleasant bitter taste behind as do the likes of saccharin. Problems have arisen, however, in that the sweetness of the dipeptide sweeteners does not last as long as that of sucrose. Moreover, the conventional dipeptide sweeteners have a monotonous quality without thickness, and tend to lack roundness in their taste quality.

Dipeptide sweeteners potentially have great commercial application, especially as low-calorie sweeteners, since the sweetness intensity of dipeptide sweeteners is about 50 to 200 times or more of that of sucrose, and they have no discernible unpleasant aftertaste like saccharin and other synthetic sweetening agents. A need therefore continues to exist for a dipeptide sweetening composition which can be substituted for sucrose and has almost the same sweetness qualities as sucrose.

SUMMARY OF THE INVENTION

Accordingly, one object of the present invention is to provide a low-calorie dipeptide sweetening composition which has a more satisfactory sweetness quality than that of dipeptide sweeteners alone.

Another object of the present invention is to provide a low calorie dipeptide sweetening composition which has a sucrose-like sweetness for various foods and beverages.

Briefly, these objects and other objects of the present invention as hereinafter will become more readily apparent can be attained by a dipeptide based sweetening composition which comprises a combination of (a) a unit weight of a dipeptide sweetener and (b) at least one flavoring agent in an amount sufficient to impart the tasting strength equal to that of 10% to 200% by wt. of monosodium L-glutamate based upon the weight of the dipeptide sweetener, the flavoring agent being selected from the group consisting of sodium glutamate, sodium inosine-5'-phosphate, sodium guanosine-5'-phosphate and sodium aspartate.

DETAILED DESCRIPTION OF THE PREFERRED EMBODIMENTS

Conventional dipeptide sweeteners which can be used as the sweetening base in the composition of the present invention include α-L-aspartyl-L-phenylalaninemethylester (AP) and α-L-aspartyl-L-phenylalanineethylester.

Monosodium L-glutamate (MSG), sodium inosine-5'-phosphate (IMP), sodium guanosine-5'phosphate (GMP) and sodium aspartate are used in the present composition as flavoring agents.

In the preparation of the sweetening composition of the present invention, one or more flavoring agents alone or in combination with monosodium L-glutamate is combined with a dipeptide sweetener in an amount sufficient to impart a tasting strength equivalent to 10% to 200% by weight, preferably 75 to 125% by weight of monosodium glutamate alone based on the amount of dipeptide sweetener present.

In the combination of MSG and IMP and/or GMP, the amount of IMP and/or GMP can be given, for instance, by the following formulas (Yamaguchi S.; *J. Food Sci.*, 32 (473) 1967 and Yamaguchi et al.; *Nippon Nogeikagaku Kaishi* 42 (6) 1968):

$$V = (Y-U)/1218U \quad \text{(FORMULA I)}$$

$$V' = (Y-U)/2800U \quad \text{(FORMULA II)}$$

$$V'' = (P+Q)(Y-U)/1218U(P+3Q) \quad \text{(FORMULA III)}$$

U: concentration (g/dl) of MSG in a solution containing MSG and IMP, MSG and GMP or MSG, IMP and GMP Y: concentration (g/dl) of MSG in a solution containing MSG alone V: concentration (g/dl) of IMP in a solution containing MSG and IMP V': concentration (g/dl) of GMP in a solution containing MSG and GMP V'': concentration (g/dl) of IMP and GMP in a solution containing MSG, IMP and GMP

P:IMP/(IMP+GMP)

Q:GMP/(IMP+GMP)

A composition which contains flavoring agents having a tasting strength less than that of 10% by wt. of MSG based on the dipeptide sweetener has a pronounced tendency to lack roundness in its sweetness compared with sucrose. Moreover, if the composition contains more than 200% by wt. of MSG, the sweetness is dimmed and the taste as a whole becomes heavy and inharmonious.

The dipeptide sweetening composition of the present invention can be used in any form such as a powder, syrup, granules or tablets. Further, it may be possible to formulate a sweetening composition by combining a dipeptide sweetener in the form of a powder, tablets, syrup or the like with one or more flavoring agents in any form such as a powder, granules or liquid.

Typical examples of use of the present dipeptide sweetening composition are as a table-use seasoning; as a sweetening material for bread, desserts, cakes, candies, chocolate, chewing-gum, cookies, ice-cream, sherbert, puddings and milk products and as a food substitute such as a coffee-whitener or whipped topping. The sweetening composition can also be used in the preparation of beverages such as powdered juice, condensed juice and the like.

Having generally described this invention a further understanding can be obtained by reference to certain specific examples which are provided herein for purposes of illustration only and are not intended to be limiting unless otherwise specified.

EXAMPLE 1

| Dipeptide Sweetening Composition (A) | |
|---|---|
| AP | 50 part by weight |
| MSG | 50 |

A sweetening solution was prepared by dissolving 0.1 g of dipeptide sweetening composition (A) in one dl of water. Separately, a solution of AP was prepared by dissolving 0.05 g of AP in one dl of water (Control). The two solutions were organolepticaly tested by a panel of 20 members who had been specially trained for this kind of test. The panel test was performed by the paired method with the solutions. The results obtained are shown in Table 1.

TABLE 1

|  | Solution containing composition (A) | Solution containing AP alone |
|---|---|---|
| Choice | 19*** | 1 |
| Evaluation | Sweetness having a thickness and round ness and more similar to sucrose than AP alone | Characteristic sweetness of AP lacking thickness |

***There is a significant difference with a risk ratio of 0.1%

EXAMPLE 2

| Dipeptide Sweetening Composition (B) | |
|---|---|
| AP | 4 part by weight |
| MSG | 3 |
| IMP | 1 |
| Creaming Powder 400 ("MARIM" produced by Ajinomoto Co., In.) | |

A coffee solution was prepared by dissolving coffee powder in 150 ml of hot water, and 4.0 g of the dipeptide sweetening composition (B) was added to the solution. As a control, 0.04 g of AP and 4 g of creaming powder ("Marim") was added to the coffee solution. The two kinds of coffee were subjected to organonoleptic testing in the same manner as described in Example 1. The results obtained are shown in Table 2.

TABLE 2

|  | Coffee containing the dipeptide sweetening composition (B) | Control |
|---|---|---|
| Choice | 16* | 4 |
| Evaluation | round sweetness | monotonous sweetness |

*There is a significant difference with a risk ratio of 5%.

EXAMPLE 3

| Dipeptide Sweetening Composition (C) | |
|---|---|
| AP | 60 Part by weight |
| MSG | 40 |

Boiled burdock was prepared by boiling 250 g of sliced burdock with 200 cc of water and 15 cc of sake for 5 minutes and then adding 0.1 g of dipeptide sweetening composition (C) to the boiled burdock and boiling again for 15 minutes. Separately, boiled burdock was prepared in the same manner described above using 0.06 g of AP for the dipeptide sweetening composition (C) (Control).

The two boiled burdocks were organolepticaly tested by a panel of 10 members who had been specially trained for this kind of test. The panel test was performed by a scoring method. The results obtained are shown in Table 3.

TABLE 3

|  | Boiled burdock containing the dipeptide sweetening composition (C) | Control |
|---|---|---|
| Mark* (mean value) | 6.9 | 5.0 |
| Evaluation | harmonized with a thick sweetness | inharmonious sweetness can be perceived |

*on the basis of 10 points

EXAMPLE 4

| Dipeptide Sweetening Composition (D) | |
|---|---|
| AP | 8 part by weight |
| MSG | 8 |
| Sodium aspartate | 16 |

Hot black tea was prepared by dissolving 0.32 g of dipeptide sweetening composition (D) and 2 g of "MARIM" in 130 ml of black tea. As a control sample, hot black tea was prepared by dissolving 12 g of sugar and 2 g of "MARIM" in 130 ml of black tea. The two black teas were organoleptically tested in the same manner as described in Example 1. The results obtained are shown in Table 4.

TABLE 4

|  | Hot black tea containing the dipeptide Sweetening composition (D) | Control |
|---|---|---|
| Choice | 16* | 4 |
| Evaluation | Rounded sweetness | astringency can be perceived |

*There is a significant difference with a risk ratio of 5%.

Having now fully described this invention, it will be apparent to one of ordinary skill in the art that many changes and modifications can be made thereto without departing from the spirit or scope of the invention set forth herein.

What is claimed as new and is intended to be secured by Letters Patent is:

1. A dipeptide sweetening composition comprising: (a) a unit weight of the methyl or ethyl ester of α-L-aspartyl-L-phenylalanine and (b) a flavoring agent in an amount sufficient to impart the tasting strength equal to that of 10 to 200 wt % of monosodium L-glutamate based on the weight of the dipeptide sweetener, said flavoring agent being monosodium glutamate optionally in the presence of at least one flavoring agent selected from the group consisting of sodium inosine-5'-phosphate, sodium guanosine-5'-phosphate and sodium aspartate.

2. The composition of claim 1, wherein the amount of ingredient (b) is sufficient to impart a tasting strength equal to that of 75 to 125% by wt. of monosodium L-glutamate based upon the weight of the dipeptide sweetener.

3. The composition of claim 1, wherein said composition is formulated as a powder, syrup, granular mixture or as tablets.

4. The composition of claim 1, wherein in the combination of monosodium glutamate and sodium inosine-5'-phosphate and/or sodium guanosine-5'-phosphate, the amounts of the sodium inosine-5'-phosphate and sodium guanosine-5'-phosphate employed alone or in combination are determined by the relationships:

$$V = (Y-U)/1218U \qquad (I)$$

$$V' = (Y-U)/2800U \qquad (II)$$

$$V'' = (P+Q)(Y-U)/1218U(P+3Q) \qquad (III)$$

U: concentration (g/dl) of monosodium glutamate in a solution containing monosodium glutamate and sodium inosine-5'-phosphate, monosodium glutamate and sodium guanosine-5'-phosphate or monosodium glutamate, sodium inosine-5'-phosphate and sodium guanosine-5'-phosphate Y: concentration (g/dl) of monosodium glutamate in a solution containing monosodium glutamate alone V: concentration (g/dl) of sodium inosine-5'-phosphate in a solution containing monosodium glutamate and sodium inosine-5'-phosphate V': concentration (g/dl) of sodium guanosine-5'-phosphate in a solution containing monosodium glutamate and sodium guanosine-5'-phosphate V'': concentration (g/dl) of sodium inosine-5'-phosphate and sodium guanosine-5'-phosphate in a solution containing monosodium glutamate, sodium inosine-5'-phosphate and sodium guanosine-5'-phosphate P: sodium inosine-5'-phosphate/(sodium inosine-5'-phosphate+sodium guanosine-5'-phosphate)

Q: sodium guanosine-5'-phosphate/(sodium inosine-5'-phosphate+sodium guanosine-5'-phosphate).

* * * * *